United States Patent
Schultz

(10) Patent No.: US 8,477,780 B2
(45) Date of Patent: Jul. 2, 2013

(54) PROCESSING PACKET INFORMATION USING AN ARRAY OF PROCESSING ELEMENTS

(75) Inventor: Robert J. Schultz, Redwood City, CA (US)

(73) Assignee: Alcatel Lucent, Paris (FR)

( * ) Notice: Subject to any disclaimer, the term of this patent is extended or adjusted under 35 U.S.C. 154(b) by 1896 days.

(21) Appl. No.: 10/809,164

(22) Filed: Mar. 25, 2004

(65) Prior Publication Data

US 2004/0190512 A1    Sep. 30, 2004

Related U.S. Application Data

(60) Provisional application No. 60/457,747, filed on Mar. 26, 2003.

(51) Int. Cl.
*H04L 12/28* (2006.01)
*H04L 12/56* (2006.01)

(52) U.S. Cl.
USPC ........................................... 370/392; 370/401

(58) Field of Classification Search
USPC ......................................................... 370/389
See application file for complete search history.

(56) References Cited

U.S. PATENT DOCUMENTS

| | | | |
|---|---|---|---|
| 6,272,621 B1* | 8/2001 | Key et al. | 712/200 |
| 6,505,269 B1 | 1/2003 | Potter | |
| 7,158,519 B2* | 1/2007 | Kanakubo | 370/392 |
| 7,193,997 B2* | 3/2007 | Van Lunteren et al. | 370/392 |
| 7,219,187 B1* | 5/2007 | Khanna et al. | 711/108 |
| 2003/0012198 A1* | 1/2003 | Kaganoi et al. | 370/392 |
| 2003/0041163 A1* | 2/2003 | Rhoades et al. | 709/232 |
| 2003/0214948 A1* | 11/2003 | Jin et al. | 370/392 |
| 2004/0085962 A1* | 5/2004 | Sugai et al. | 370/392 |
| 2004/0165588 A1* | 8/2004 | Pandya | 370/389 |
| 2005/0232274 A1* | 10/2005 | Kadambi et al. | 370/392 |

* cited by examiner

*Primary Examiner* — Eunsook Choi
(74) *Attorney, Agent, or Firm* — Wilson, Ham & Holman

(57) ABSTRACT

Processing packet information using an array of processing elements involves performing search-independent processing on packet information in parallel with a search of a first stage memory unit and then using the processed information and the result from the search of the first stage memory unit to generate search information for a search of a second stage memory unit. The search-independent processing of packet information in parallel with search operations can be repeated at each stage of the array. By performing search-independent processing of packet information in parallel with search operations instead of serially, latency that is contributed from the relatively slow search operations is reduced.

3 Claims, 5 Drawing Sheets

PROCESSING PACKET INFORMATION USING AN ARRAY OF PROCESSING ELEMENTS

CROSS-REFERENCE TO RELATED APPLICATION

This application is entitled to the benefit of provisional Patent Application Ser. No. 60/457,747, filed 26 Mar. 2003.

FIELD OF THE INVENTION

The invention relates generally to communications networks, and more particularly to arrays of processing elements.

BACKGROUND OF THE INVENTION

Processing engines that include arrays of processing elements are used in network devices such as routers and switches to increase the speed of packet processing. Operations performed by an array of processing elements (often referred to as a "systolic" array) include processing packet header information and using the processed information to find some other information in a look up table that is stored in memory. Examples of information that is obtained through the lookups include destination address, access control, policy information, rate control, traffic classification etc. The rate at which packet information can be processed through an array of processing elements sets the throughput of a processing engine and in turn the throughput of the network device.

Arrays of processing elements usually are divided into stages of processing elements, where the processing elements within each stage perform similar operations. Each stage of the array has a corresponding memory unit that stores a lookup table that is specific to the stage. Operations performed at each stage of the array include: processing packet header information to produce search information, sending the search information to the corresponding memory unit, performing a search, returning the results of the search back to the corresponding processing element, and then forwarding the packet header information and the search results to a next stage processing element in the systolic array. These operations are performed in a serial manner because the next stage processing is usually dependent on the results from the previous stage search.

Although advances in memory speed and search techniques have been made, the search operations are still slow in comparison to the processing speed of the processing elements. Because of the difference in processing speeds between the search operations and the packet processing, processing elements can sit idle while search operations are performed. As such, it is often the case that the search operations are the limiting factor in overall performance when using an array of processing elements.

In view of this, what is needed is a technique for more efficiently processing packet information using an array of processing elements.

SUMMARY OF THE INVENTION

Processing packet information using an array of processing elements involves performing search-independent processing on packet information in parallel with a search of a first stage memory unit and then using the processed information and the result from the search of the first stage memory unit to generate search information for a search of a second stage memory unit. The search-independent processing of packet information in parallel with search operations can be repeated at each stage of the array. By performing search-independent processing of packet information in parallel with search operations instead of serially, latency that is contributed from the relatively slow search operations is reduced.

A method for processing packet information using an array of processing elements involves performing a first search related to a packet using first search information, performing in parallel with the first search search-independent processing on information related to the packet, and performing search-dependent processing using the result from the first search and a result of the search-independent processing to produce second search information.

A system for processing packet information includes an array of processing elements that has at least one first stage processing element and at least one second stage processing element and a first stage memory that is searched in response to search information from the first stage processing element. The first and second stage processing elements are configured to allow the second stage processing element to perform search-independent processing related to a packet in parallel with a search of the first stage memory unit, where the search is related to the same packet.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF THE INVENTION

Figure 1:
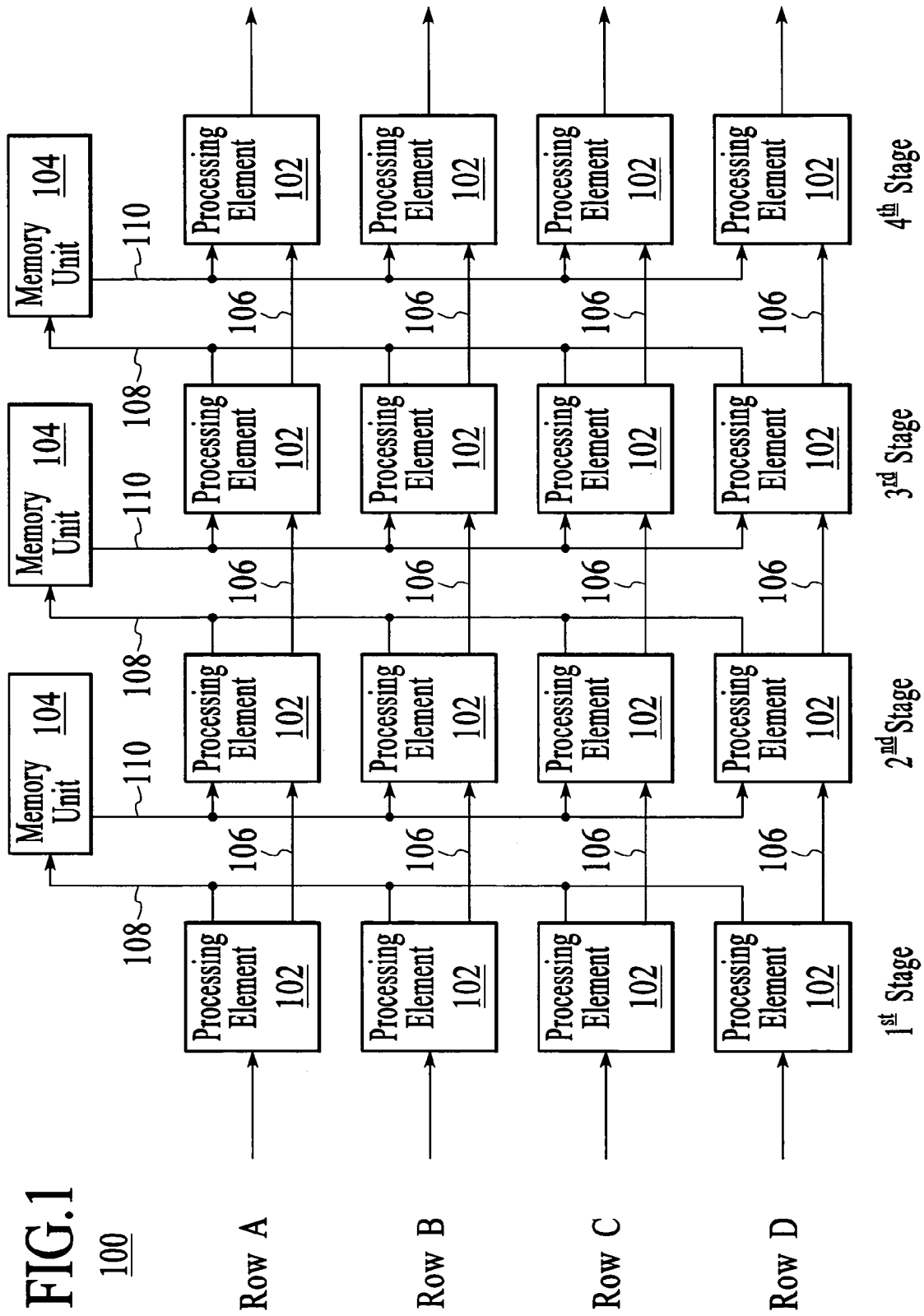
FIG. 1 depicts a processing system that includes a systolic array of processing elements and multiple memory units.

FIG. 1 depicts a processing system 100 that includes an array of processing elements 102 and multiple memory units 104. The array of processing elements is organized into rows and columns. The processing elements within each column perform similar functions to each other and utilize the same memory unit. The processing elements in the same column and the corresponding memory unit represent a processing stage. The processing system of FIG. 1 includes four stages (e.g., stages 1, 2, 3, and 4) and four rows (e.g., rows A, B, C, and D). Information passes through the processing elements sequentially on a per-row basis from the first stage processing element of a row, to the second stage processing element, to the third stage processing element, and then to the fourth stage processing element of the same row. The array configuration of processing elements enables multiple look ups to be performed on the same packet in an efficient manner. Additionally, the array configuration enables multiple rows of processing elements to operate in parallel.

The processing elements 102 of the array are independently programmable processing elements. Basic building blocks of a processing element include a microengine and memory. In an embodiment, the microengines are five-stage (prefetch, fetch, decode, execute, and writeback) pipelined very large instruction word (VLIW) microengines and the memory includes a data in FIFO buffer (for storing data from previous stage processing element), a context data in FIFO buffer (for storing data from previous stage memory unit), jumptable memory (for mapping packet type to microcode start address), and a microcode memory. Microcode programmed into the processing elements enables the specific functionality of each processing element. Functions of the processing elements include reading packet header information, parsing packet header information, generating search information (e.g., search keys), initiating searches, formatting search results, and forwarding packet information to next stage processing elements. Each processing element can execute microcode apart from the other processing elements. The microcode that is executed by a particular processing element is dependent only on the type of information that the processing element receives. Therefore, each processing element in the same stage is not necessarily performing the same operation. This is different from a traditional systolic array, in which each processing element at the same stage performs exactly the same operation synchronously with the others. In an embodiment, the processing elements operate at 200 MHz. Specific operations performed by the processing elements are described in more detail below.

The memory units 104 store table information such as forwarding tables, classification information, access control lists (ACLs), rate control information or any other type of information that may be useful in packet processing. In the embodiment of FIG. 1, the memory units include tertiary content addressable memory (CAM) that outputs a search result or results in response to search information. As is well known, tertiary CAMs are searched using a search key that includes a comparand and mask. The search result from a CAM may include, for example, forwarding, classification, access control, or rate control information. Although the memory units depicted in FIG. 1 are physically separate from each other, it is possible that the memory units are physically connected to each other but logically separated into logically distinct memory units. For example, one CAM system may be logically separated into multiple logically distinct memory units. Although the memory units are described as tertiary CAMs, other types of memory such as DRAM and SRAM are possible. Additionally, the memory units may be internal or external to the processing system or a combination thereof.

In the array of FIG. 1, the output of one processing element 102 is linked to the input of the next stage processing element in the same row. For example, the output of the first stage processing element in row A is linked to an input of the second stage processing element in row A. The communications links 106 between the processing elements may be, for example, a 36-bit 200 MHz bus.

Each processing element 102 is connected to provide search information (i.e., a search key that includes a comparand and mask) to the memory unit 104 of the same stage. In an embodiment, the communications link 108 between the processing elements in the same stage and the respective memory unit includes a 72-bit bus that operates at 100 MHz DDR (effectively 200 MHz), such that a 144-bit search key (i.e., a comparand and mask) can be provided to the memory unit every clock cycle. In the embodiment of FIG. 1, the bus of a particular stage is shared among all of the processing elements at the respective stage although independent buses between the processing elements and the respective memory unit could be used.

Each memory unit 104 is also connected to provide search results directly to the processing elements 102 in the next stage. For example, the output of a memory unit is connected to an input of each of the next stage processing elements. In an embodiment, the communications link 110 between the output of the memory units and an input of the next stage processing elements includes a 36-bit bus that operates at 100 MHz, such that a 36-bit search result can be provided to the next stage processing element every clock cycle.

Figure 2:
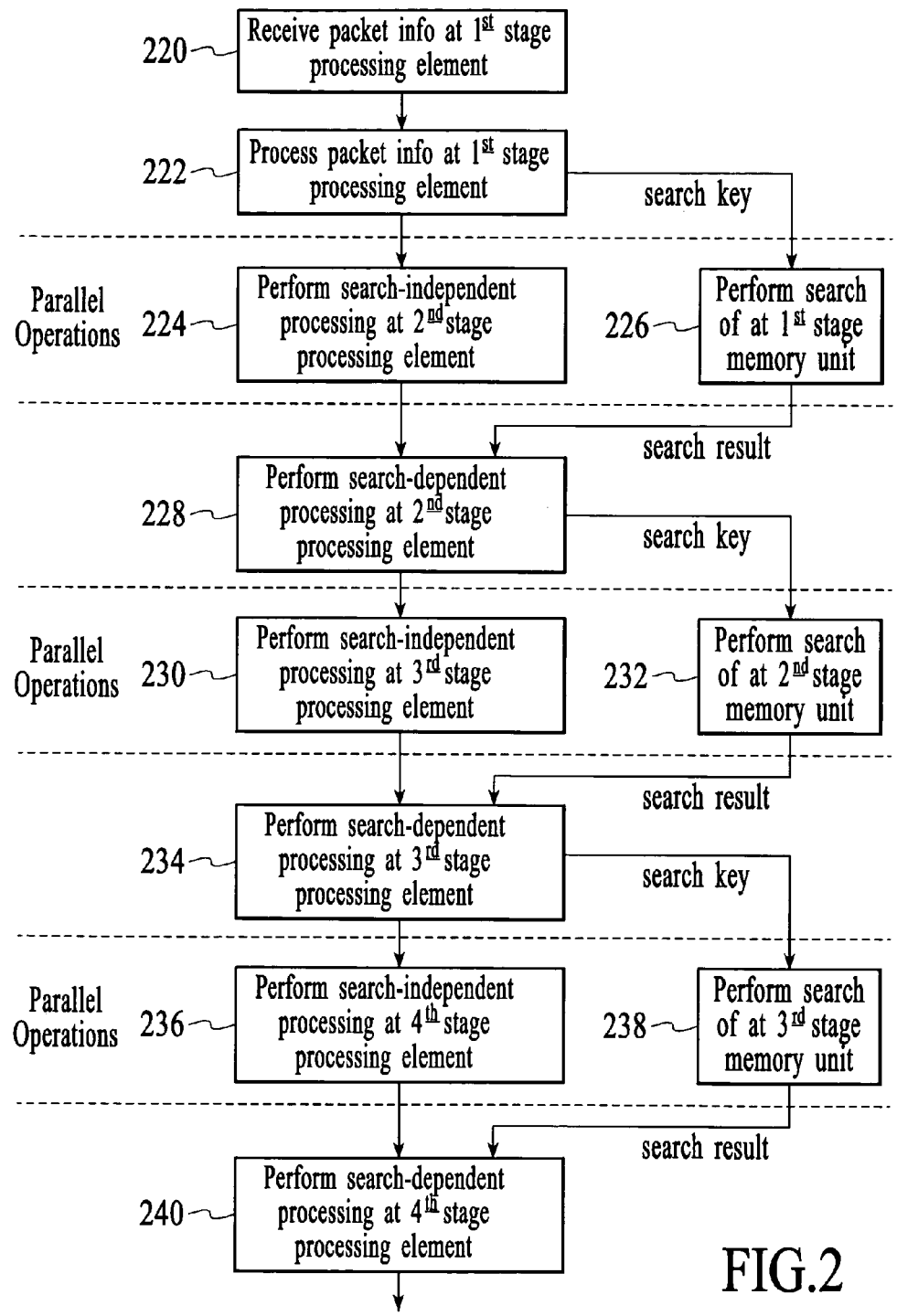
FIG. 2 is a process flow diagram of an exemplary operation of the systolic array of processing elements of FIG. 1.

Operation of the array of processing elements 102 is described with reference to FIGS. 1 and 2. For example purposes the operation is described relative to a single exemplary packet whose packet information is processed through one row (e.g., row A) of processing elements. Referring to FIG. 2, at block 220, packet information related to the exemplary packet is received at the first stage processing element. At block 222, the packet information is processed at the first stage processing element. As part of the processing, the first stage processing element produces search information (e.g., in the form of a search key that includes a comparand and mask) that is used to search the first stage memory unit. The first stage processor also forwards packet related information to the second stage processing element. In parallel operations, the second stage processing element processes the packet related information that is received from the first stage processing element (block 224) while the search of the first stage memory unit is performed (block 226). The processing that is done by the second stage processing element in parallel with the search of the first stage memory unit is processing that is not dependent on the result from the search of the first stage memory unit. This processing is referred to herein as "search-independent" processing. Examples of search-independent processing include packet header assembly, packet header parsing, partial key formatting, fetch of local variables required by the particular packet type, local processing specific to the memory bank of the respective stage. The results from the search-independent processing may include intermediate information and/or an intermediate processing state. Because the processing speed of the processing elements is much faster than the search operations, the search-independent processing is usually performed by the second stage processing element before the search result is received by the second stage processing element. In an embodiment, the processing element does as much processing as it can without the search result and then stalls in an intermediate state until the search result is received. Referring to block 228, once the search result is received by the second stage processing element, the second stage processing element can immediately start processing using the result from the search of the first stage memory unit and a result of the search-independent processing (e.g., an intermediate processing stage and/or intermediate information) to produce a search key that is used to search the second stage memory unit. This processing is referred to as "search-dependent" processing because it is dependent on the search result from the previous stage. Because the second stage processing element has already performed the search-independent processing in a parallel operation, the second stage processing element is able to immediately start the search-dependent processing to produce the next search key without having to do any pre-processing (that is, processing that is not dependent on the search result from the prior stage). The parallel operation therefore reduces the latency that would exist if the pre-processing and search operations were performed serially. The parallel operations of the search-independent processing and the prior stage search are not required to be performed simultaneously. That is, the operations are considered to be performed in parallel even if the search-independent processing is completed before the search is performed.

Referring to block 228, the second stage processor also forwards packet information to the third stage processing element. Once again, in parallel operations, the third stage processing element performs search-independent processing on the packet information that is received from the second stage processing element (block 230) while the search of the second stage memory unit is performed (block 232). The search-independent processing that is done by the third stage processing element in parallel with the search of the second stage memory unit is processing that does not require the result from the search of the second stage memory unit. Referring to block 234, once the result from the search of the second stage memory is received by the third stage processing element, the third stage processing element can immediately start search-dependent processing using the result from the search of the second stage memory unit and a result of the search-independent processing to produce a search key that is used to search the third stage memory unit. The process repeats (see blocks 236, 238, and 240) as described above until the packet information has been processed through all of the processing elements in the respective row.

Figure 3:
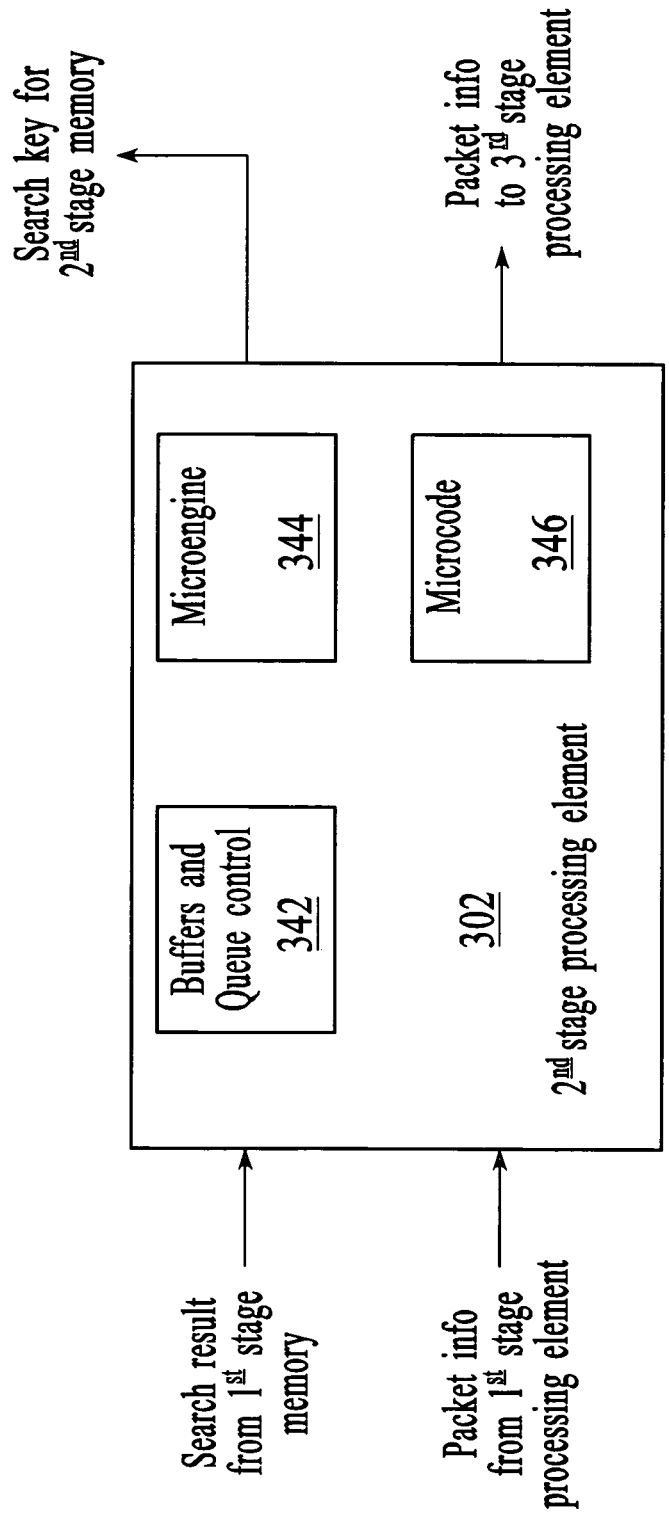
FIG. 3 depicts an expanded view of a processing element from FIG. 1, for example, a second stage processing element.

FIG. 3 depicts an expanded view of a processing element 102 from FIG. 1, for example a second stage processing element. The processing element includes buffers and queue control 342, a microengine 344, and microcode 346. The buffers and queue control buffer incoming information so that it can be provided to the microengine as needed. For example, the buffer and queue control ensures that search results and pre-processed information from the same packet are processed together to produce the proper search information. The microcode determines how the packet information is processed. Further, the type of microcode that is executed is dependent on the packet information itself. The buffer and queue control is utilized because some microcode can take more time to execute than other microcode, causing new packet information to arrive before the previous packet information is completely processed. The microcode can be changed as needed to achieve the desired functionality. The microengine executes the microcode to process packet information and search results. The functional elements depicted in FIG. 3 can be implemented in any combination of hardware, software, and firmware. Additionally, the functional elements may be distributed within the processing element in any manner and are not limited to distinct physical boundaries within the processing element.

In operation, the second stage processing element 302 receives packet information from the first stage processing element and a search result from the first stage memory unit. As described above with reference to FIGS. 1 and 2, the packet information is typically received by the second stage processing element before the search result and the second stage processing element performs search-independent processing on the packet information while it waits to receive the corresponding search result. Once the second stage processing element receives the search result from the first stage memory unit, the processing element performs search-dependent processing using the search result and a result of the search-independent process to produce the search information (e.g., a search key that includes a comparand and a mask) for the search of the second stage memory unit. In addition to the above-described functions, the second stage processing element also forwards packet information to the third stage processing element. For example, immediately upon receiving packet information the processing element streams the received packet information to the next stage processing element in the same form that it arrived. The streaming of packet information to a next stage processing element allows the next stage processing element to start performing search-independent processing on the streamed information.

Figure 4:
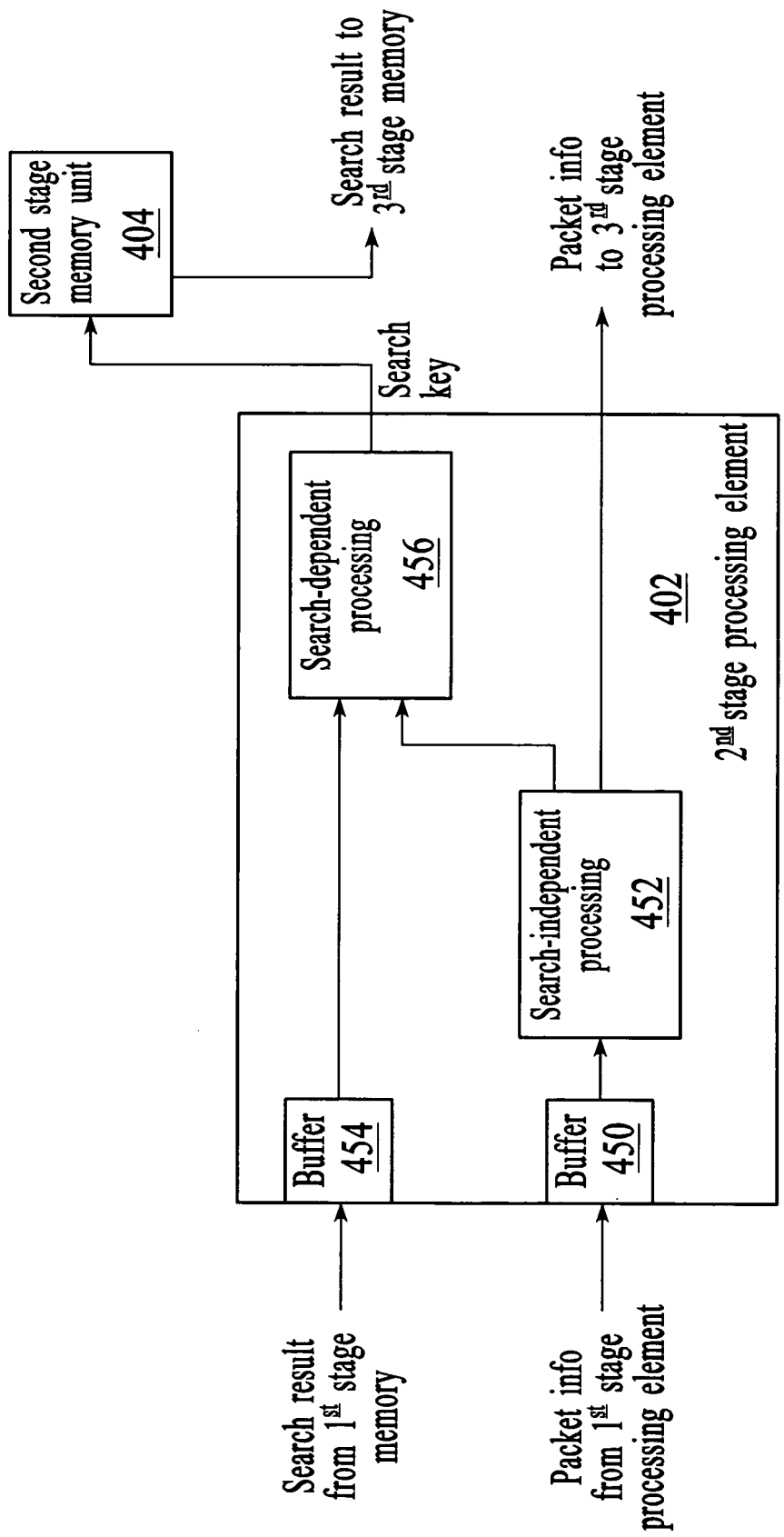
FIG. 4 depicts an expanded view of a processing element from FIG. 1, for example a second stage processing element, which illustrates the functional relationship of operations that are performed by a processing element.

FIG. 4 depicts an expanded view of a processing element 102 from FIG. 1, which illustrates the functional relationship of operations that are performed by a processing element, for example a second stage processing element. The processing element 402 receives packet information from the first stage processing element in a buffer 450 (e.g., a FIFO buffer). Typically, this packet information is received before the prior stage search has been performed and before the search result is received. The processing element performs search-independent processing on the packet information (functional bock 452). The search-independent processing may include, for example, loading of data/variables required for the respective stage of processing, loading of microcode, processing of data for use in subsequent stage, extracting fields from packet headers, format fields in search key, passing on data/variables that are required for the next stage of processing engines or any other processing that can be done without the prior stage search result. The processing element also passes packet information on to the third stage processing element. This packet information may include processed or unprocessed packet information. In an embodiment, the processing element does all of the search-independent processing that it can and then stalls in an intermediate processing state until the search result is received. Once the search result is received, it may be briefly buffered (functional block 454) in order to synchronize information within the processing element. The processing element then performs search-dependent processing using the search result and a result of the search-independent processing (functional block 456) to produce the search information (e.g., a search key that includes a comparand and a mask) that is used to search the second stage memory unit 404. The result from the search of the second stage memory is then provided to the third stage processing element.

Figure 5:
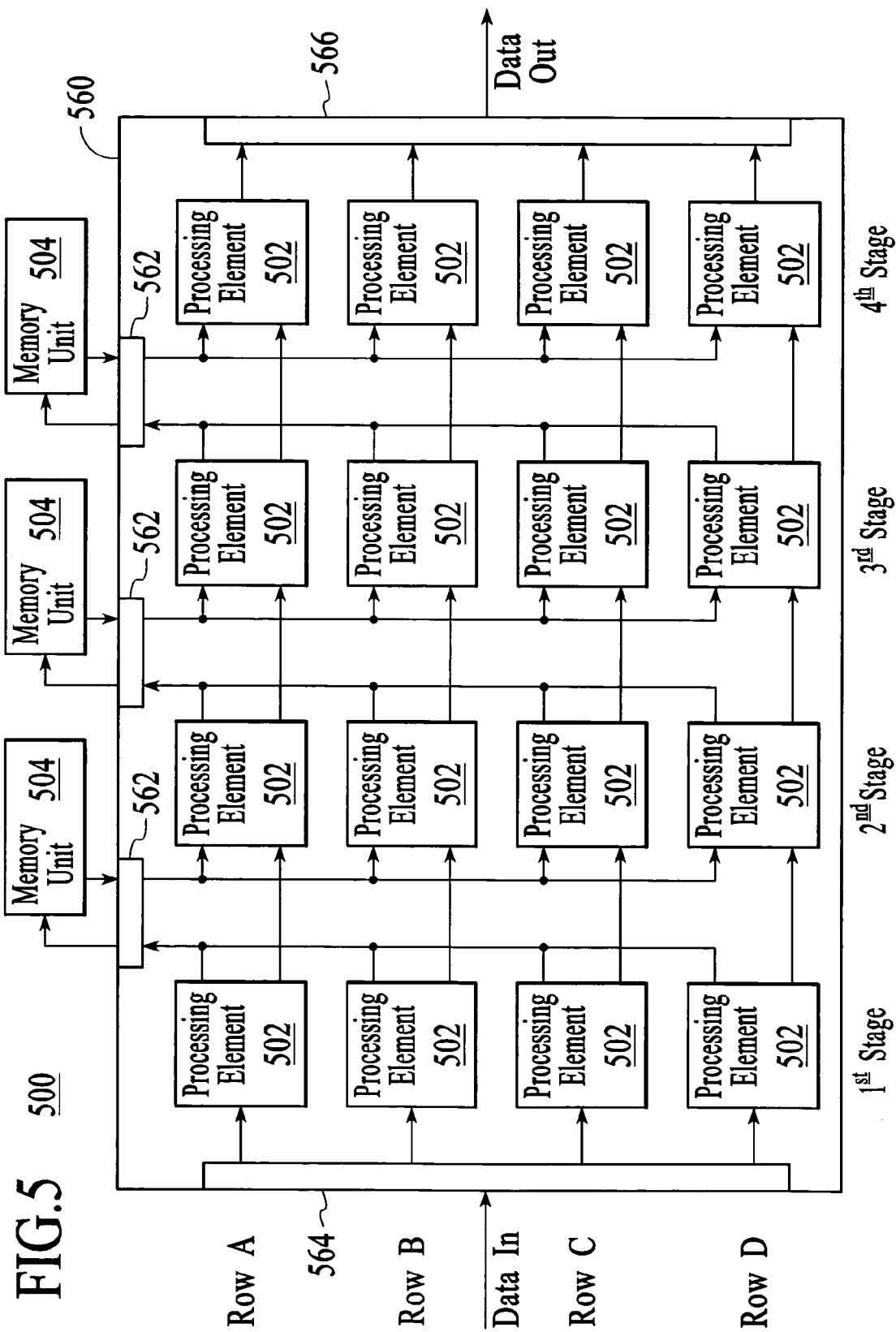
FIG. 5 depicts a systolic array of processing elements and memory interfaces to stage-specific memory units, which are included on a single integrated circuit device.

In one embodiment, the array of processing elements is formed onto a single integrated circuit (IC) chip and the memory units are external to the IC chip. Information is communicated between the processing elements and the external memory through memory interfaces. FIG. 5 depicts an IC chip 560 that includes an array of processing elements 502 and memory interfaces 562 to stage-specific memory units 504. The IC chip also includes an input interface 564 for receiving packet related information from at least one device and an output interface 566 for providing the results of the processing to other devices. Alternatively, the processing elements could be on different IC chips or the processing elements could be threads in a multi-threaded processor.

In an embodiment, the input interface 564 includes the ability to selectively distribute the incoming packet information to the different rows of processing elements. The selective distribution may be optimized to increase the efficiency of the overall processing system. In an embodiment, the input interface may utilize a round-robin distribution approach that includes all of the rows with processing elements that have processing bandwidth available. An input interface that performs selective distribution can be implemented whether or not all of the processing elements are formed onto a single IC.

In an alternative embodiment, search results can be provided to the next stage processing element through the previous stage processing element instead of through a direct connection.

Packet-related information that may be processed by the processing elements included, for example, packet type, source IP address, destination IP address, source MAC address, destination MAC address, virtual circuit information, tag information, etc.

The term "packet" as used herein includes both variable-length packets (e.g., IP packets and Ethernet packets) and fixed-length packets (e.g., ATM cells).

Although specific embodiments of the invention have been described and illustrated, the invention is not to be limited to the specific forms or arrangements of parts as described and illustrated herein. The invention is limited only by the claims.

What is claimed is:

1. A system for processing packet information comprising:
    an array of processing elements having;
        at least one first stage processing element; and
        at least one second stage processing element; and
    a first stage memory unit that is searched in response to search information from the first stage processing element;
    wherein the first and second stage processing elements are configured to allow the second stage processing element to perform search-independent processing related to a packet in parallel with a search of the first stage memory unit, where the search is related to the same packet;
    wherein the second stage processing element is further configured to perform search-dependent processing using a result of the search of the first stage memory unit and a result from the search-independent processing to produce a search key;
    further including a second stage memory unit that is associated with the second stage processing element, wherein the search key is used to search the second stage memory unit; and
    further including at least one third stage processing element, wherein the second and third stage processing elements are configured to allow the third stage processing element to perform search-independent processing related to the packet in parallel with the search of the second stage memory unit.

2. The system of claim 1 further including a direct communications link between the first stage memory unit and the second stage processing element configured to provide search results directly to the second stage processing element from the first stage memory unit.

3. The system of claim 1 wherein the first stage memory unit comprises content addressable memory.

* * * * *